US012659200B2

(12) United States Patent
Harel et al.

(10) Patent No.: US 12,659,200 B2
(45) Date of Patent: *Jun. 16, 2026

(54) DIGITAL SIGNAL SYMBOL DECISION GENERATION WITH CORRESPONDING CONFIDENCE LEVEL

(71) Applicant: Mellanox Technologies, Ltd., Yokneam (IL)

(72) Inventors: Oz Harel, Ness Ziona (IL); Hananel Faig, Jerusalem (IL); Yair Yakoby, Kfar Shmuel (IL)

(73) Assignee: Mellanox Technologies, Ltd., Yokneam (IL)

( * ) Notice: Subject to any disclaimer, the term of this patent is extended or adjusted under 35 U.S.C. 154(b) by 62 days.

This patent is subject to a terminal disclaimer.

(21) Appl. No.: 18/644,936

(22) Filed: Apr. 24, 2024

(65) Prior Publication Data

US 2024/0283680 A1    Aug. 22, 2024

Related U.S. Application Data

(63) Continuation of application No. 17/850,406, filed on Jun. 27, 2022, now Pat. No. 12,003,355.

(51) Int. Cl.
| | |
|---|---|
| *H04L 25/03* | (2006.01) |
| *H04L 1/00* | (2006.01) |
| *H04L 1/20* | (2006.01) |
| *H04L 27/01* | (2006.01) |

(52) U.S. Cl.
CPC ...... *H04L 25/03987* (2013.01); *H04L 1/0054* (2013.01); *H04L 1/203* (2013.01); *H04L 27/01* (2013.01)

(58) Field of Classification Search
CPC . H04L 25/03987; H04L 27/01; H04L 1/0047; H04L 1/0054; H04L 1/203; H04L 25/03318; H04L 25/067
See application file for complete search history.

(56) References Cited

U.S. PATENT DOCUMENTS

| | | | |
|---|---|---|---|
| 8,175,071 B2 | 5/2012 | Nam et al. | |
| 10,491,432 B1 * | 11/2019 | Medra | H04L 25/03159 |
| 10,700,797 B2 | 6/2020 | Jacob | |
| 12,244,441 B2 * | 3/2025 | Maunder | H04L 25/03318 |
| 2004/0187066 A1 | 9/2004 | Ichihara et al. | |
| 2014/0321525 A1 | 10/2014 | Eliaz et al. | |
| 2018/0351776 A1 | 12/2018 | Cao et al. | |
| 2022/0418008 A1 * | 12/2022 | Decurninge | H04L 1/0057 |

OTHER PUBLICATIONS

Fettweis G., et al., "Feedforward Architectures for Parallel Viterbi Decoding," Journal of VLSI Signal Processing, Kluwer Academic Publishers, Boston, Manufactured in the Netherlands, 1991, vol. 3, pp. 105-119.

* cited by examiner

*Primary Examiner* — Dac V Ha

(74) *Attorney, Agent, or Firm* — Lowenstein Sandler LLP

(57) ABSTRACT

A receiver to generate a first vector of a first sequence of a portion of symbols of a signal. The receiver further generates a second vector of a second sequence of the portion of symbols, wherein the second sequence comprises a flipped version of the first sequence. Based at least in part on the first vector and the second vector, a decision including a sequence of one or more bits that represent at least a portion of the signal and a confidence level corresponding to the decision are generated.

20 Claims, 12 Drawing Sheets

Figure 1A:
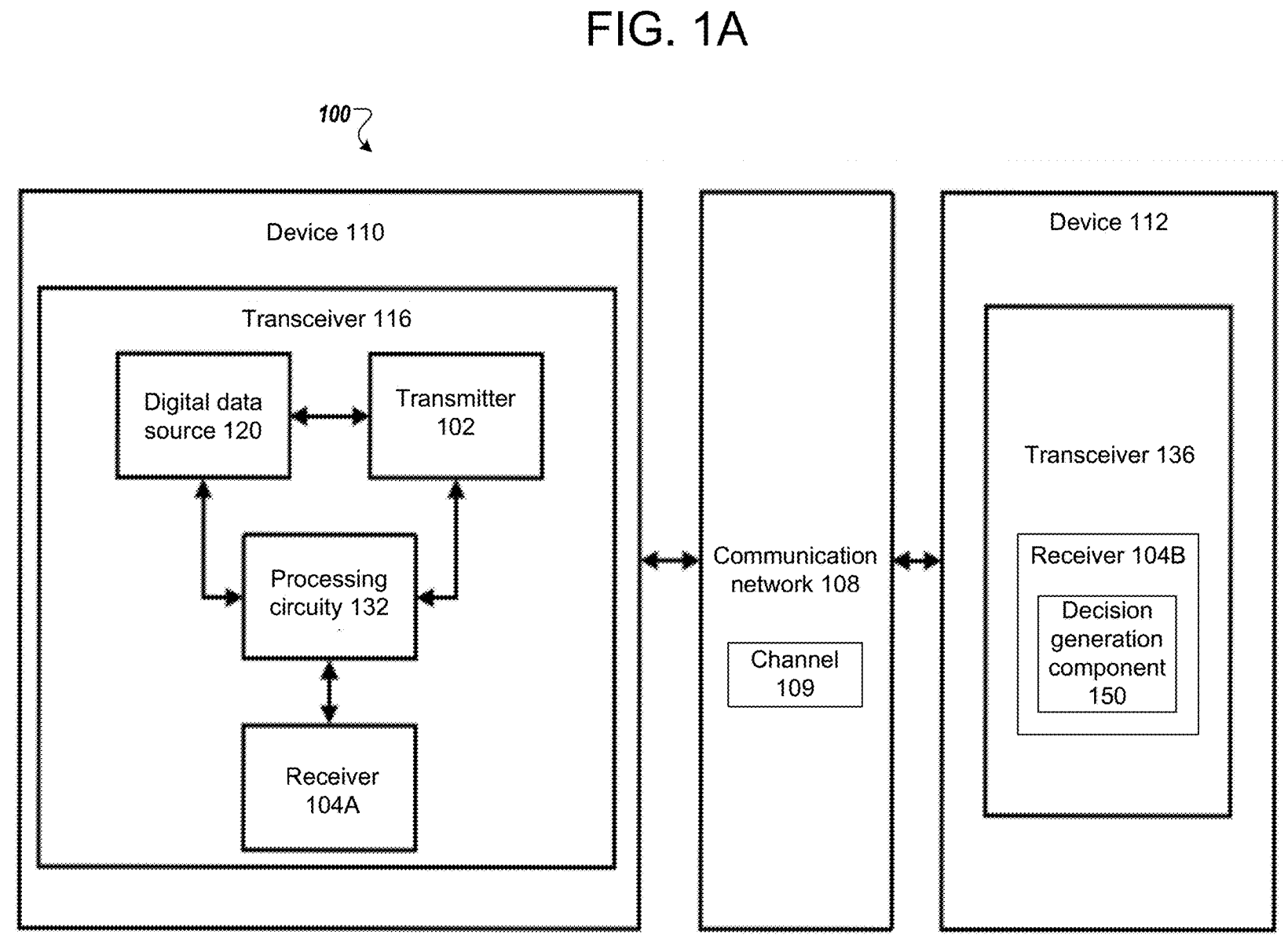

Device 110

Transceiver 116

Transmitter 102

Digital data source 120

Processing circuity 132

Receiver 104A

Communication network 108

Channel 109

Device 112

Transceiver 136

Receiver 104B

Decision generation component 150

FIG. 4
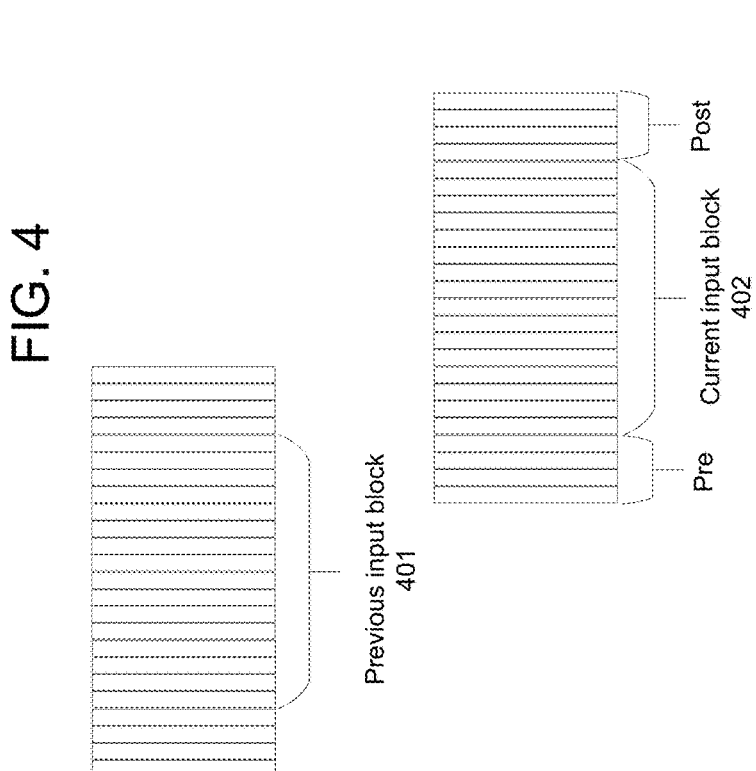
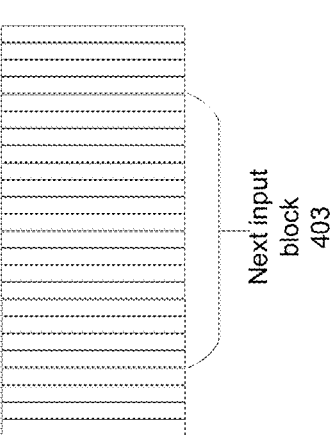
Previous input block
401
Pre     Current input block     Post
402
Next input
block
403

FIG. 8

| X[n] | X_{i-1}[n] | Diff Precoder - Decoder |
|---|---|---|
| -3 | -3 | -3 |
| -3 | -1 | -1 |
| -3 | 1 | 1 |
| -3 | 3 | 3 |
| -1 | -3 | -1 |
| -1 | -1 | 1 |
| -1 | 1 | 3 |
| -1 | 3 | -3 |
| 1 | -3 | 1 |
| 1 | -1 | 3 |
| 1 | 1 | -3 |
| 1 | 3 | 1 |
| 3 | -3 | 3 |
| 3 | -1 | -3 |
| 3 | 1 | -1 |
| 3 | 3 | 1 |

Figure 10:
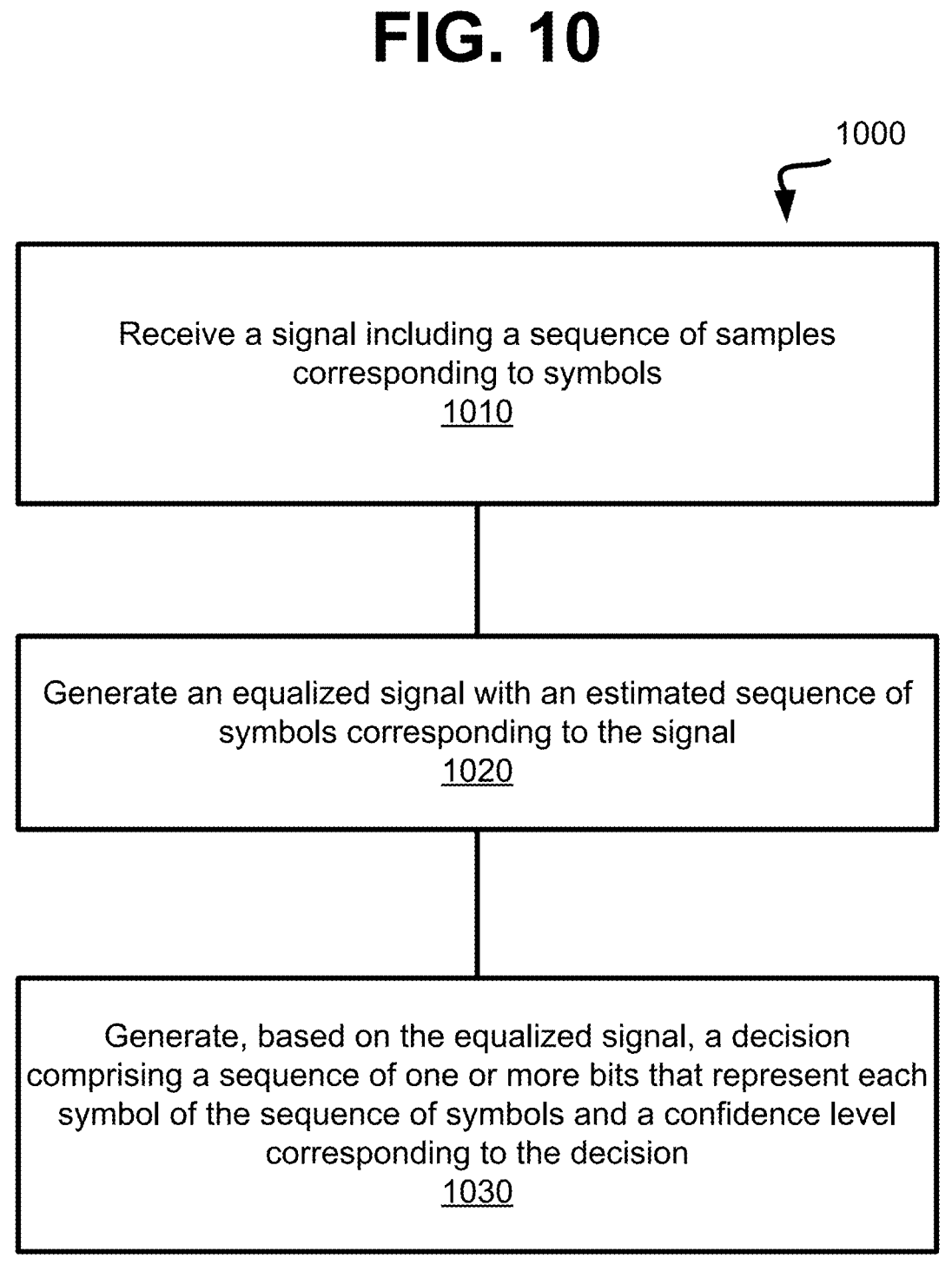

Receive a signal including a sequence of samples corresponding to symbols
1010

Generate an equalized signal with an estimated sequence of symbols corresponding to the signal
1020

Generate, based on the equalized signal, a decision comprising a sequence of one or more bits that represent each symbol of the sequence of symbols and a confidence level corresponding to the decision
1030

DIGITAL SIGNAL SYMBOL DECISION GENERATION WITH CORRESPONDING CONFIDENCE LEVEL

CROSS-REFERENCE TO RELATED APPLICATION

This application is a continuation of U.S. patent application Ser. No. 17/850,406, filed Jun. 27, 2022, titled "Digital Signal Symbol Decision Generation with Corresponding Confidence Level", the entire disclosure of which is incorporated herein by reference.

TECHNICAL FIELD

At least one embodiment pertains to processing resources used to perform high-speed communications. For example, at least one embodiment pertains to technology for decoding component to generate hard-decision symbol estimation and soft-decision estimation to produce a confidence level or certainty corresponding to each of the hard-decision symbol estimates.

BACKGROUND

Communications systems transmit and receive signals at a high data rate (e.g., up to 200 Gbits/sec). Increasing rates of data transfer in a communication channel result in a higher level of insertion loss (IL). For example, in some communication channels, the insertion loss can be as high as −70 dB at the Nyquist frequency. To overcome the problems associated with high IL channels, a typical equalization scheme is employed which is targeted to a high order partial response (PR), such as, for example, a PR1 (1+D) response or a PR2 $(1+2D+D^2)$ response (where D is a delay). These higher-order partial responses require a narrower bandwidth (BW) and achieves better Bit Error Rate (BER) results.

In some communication systems, an equalization component is employed (e.g., a Feed-Forward Equalizer (FFE) or Maximum Likelihood Sequences Estimator (MLSE)) to provide optimized equalization of time variations in the propagation channel characteristics and achieve the advantages of the partial response and reach the desired BER results. For example, the MLSE can be implemented by a Viterbi algorithm (e.g., an algorithm to obtain a maximum a posteriori probability estimate of a most likely sequence of hidden states that results in a sequence of observed events) and use the partial response equalization output to decode hard-decision symbols. In some systems, the hard-decision decoded symbols are passed to a hard-decision forward error correction (FEC). In some protocols, a differential precoder is used before the hard-decision FEC to reduce burst error effects.

In order to achieve the target BER results, some systems employ inner or outer soft-decision FEC schemes, in addition to the high order of PR responses. For example, a soft-decision FEC scheme can be employed which uses a soft input for each decoded symbol which provides a confidence level or certainty associated with the corresponding decoded symbol. In some systems, the soft-decision FEC scheme uses the certainty information (e.g., the soft-decision output) to improve the BER performance, as compared with the hard-decision FEC schemes (e.g., a BER improvement represented by a number of dBs in the system's signal-to-noise ratio (SNR) as represented in a corresponding BER-SNR relationship curve.

Accordingly, there is a need for a cost-effective and efficient approach to enable the generation of hard-decision relating to a set of symbols of a received signal along with a soft-decision approximation of a certainty or confidence level associated with each hard-decision combined with differential precoder.

BRIEF DESCRIPTION OF DRAWINGS

Various embodiments in accordance with the present disclosure will be described with reference to the drawings, in which:

FIG. 1A illustrates an example communication system, in accordance with at least some embodiments.

FIG. 4 illustrates example processing of multiple blocks of symbols to generate an overlap block of symbols including pre and post blocks with a current input block, in accordance with at least some embodiments.

FIG. 8 illustrates an example differential precoder receiver mapping, in accordance with at least some embodiments.

FIG. 10 is a flow diagram of a method of decoding a received digital signal to determine a hard decision corresponding to samples of the received digital signal with a corresponding soft decision decoding to generate a confidence level that indicates a confidence or certainty for each hard decoded decision, in accordance with at least some embodiments.

DETAILED DESCRIPTION

Figure 1B:
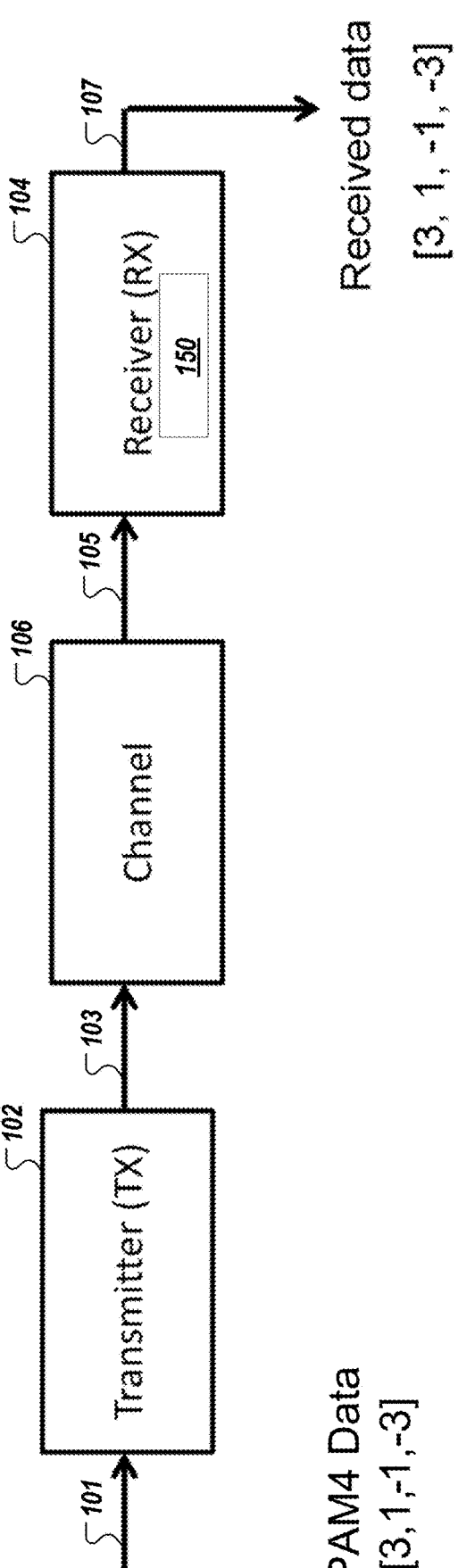
FIG. 1B illustrates a block diagram of an exemplary communication system employing an example modulation scheme, in accordance with at least some embodiments.

As described above, various types of decoding of a high-speed digital signal received by a receiver in a communication system may be needed. For example, typical soft-decision MLSE-based approaches may be used to address high insertion loss levels associated with high speed baud and data rates. However, common approaches (e.g., the Soft Output Viterbi Algorithm) fail to provide both hard-decision decoding with a corresponding soft-decision output for each of the hard-decision symbols or bits.

Advantageously, aspects of the present disclosure are directed to a decision generation component, also referred to as a "soft MLSE with differential precoder", configured for implementation in a digital signal receiver. In an embodiment, the decision generation component generates hard decisions (e.g., symbols or bits) relating to a received digital signal. In addition, the decision generation component generates a confidence level or certainty for each of generated hard decisions (e.g., each symbol or bit). In an embodiment, the confidence level can a log likelihood ratio (LLR) or an approximation of the log probabilities of the LLR for each hard decision. Accordingly, the decision generation component decodes the received digital signal to determine a hard decision (e.g., a fixed set of possible values such at "0" or "1" in binary code) corresponding to samples of the received digital signal. In addition, the decision generation component performs soft decision decoding to generate a confidence level (e.g., a number in a range of values) that indicates a reliability or certainty for each hard decision (e.g., each symbol/bit).

In an embodiment, the decision generation component can implement a soft MLSE algorithm for use in an inner or outer serializer/deserializer (SerDes) soft FEC receiver schemes. According to aspects of the present disclosure, the decision generation component can be implemented in a high speed SerDes having a digital clock rate that is lower compared to the baud rate. The digital receiver can employ parallel hardware (HW) to enable parallel processing of the symbols. Accordingly, the decision generation component can execute the MLSE algorithm or processing on a block of symbols (e.g., a group of some symbols), as compared to symbol-by-symbol processing of some typical systems.

According to embodiments, the decision generation component can implement the soft MLSE process to calculate a state's log likelihood probability vector for each input sample corresponding to a partial response (PR) of the received digital signal, where each state probability corresponds to a possible symbol value corresponding to the partial response. For example, in PR1, there are 4 state probabilities which correspond to symbol values ($-3, -1, 1, 3$). In another example, in PR2, there are 16 state probabilities corresponding to symbol sequences $-3$ $-3$, $-3$ $-1$, $-3$ $1, \ldots$ etc.

In an embodiment, the state's log likelihood probabilities vector for each sample is determined by executing an estimation (e.g., a Viterbi algorithm) on the symbol block via a first decoder (e.g., a regular Viterbi that processes the regular input vector) and a second decoder (e.g., a flipped Viterbi) that processes a flipped version of the input vector. The two decoders (e.g., the regular Viterbi and the flipped Viterbi) provide, for each input sample, a partition (from the input samples) of the state's log likelihood probabilities vector. In an embodiment, a summation or addition operation can be executed using the two generated vectors to determine a full state's log likelihood probabilities vector.

In an embodiment, the decision generation component transforms the state's log likelihood probabilities vector to a symbol's log likelihood probabilities vector (e.g., in accordance with an applicable modulation scheme (e.g., pulse amplitude modulation (PAM) 4) with a differential precoder operation. In an embodiment, using the differential precoder operation and a maximum operation, all the possible options of state's log likelihood probabilities are calculated for each element in the symbol log likelihood probabilities output vector. In an embodiment, the decision generation component uses a differential precoder receiver mapping (e.g., as shown in FIG. 8), and selects a maximal symbol value as the one to be the symbol's log likelihood probability.

According to embodiments, the processing performed by the decision generation component can be implemented for any modulation scheme (e.g., PAM or quadrature amplitude modulation (QAM), etc. schemes) using any number of Viterbi taps. For example, embodiments described herein include examples using PAM2/PAM4 modulation, for 2 tap Viterbi and 3 tap Viterbi processing. Moreover, the decision generation component can be integrated into a MLSE architecture, such as a reduced states Viterbi algorithm or an M-states Viterbi algorithm.

Advantageously, the decision generation component can be implemented as a cost-efficient design for a high-speed receiver to calculate a state's log likelihood probabilities vector for each input sample and transform the state's log likelihood probabilities vector to the symbol's log likelihood probabilities vector. The processing results in the generation of a hard decision including a sequence of one or more bits that represent each symbol of a sequence of symbols corresponding to samples of the received signal and a confidence level corresponding to each of the generated hard decisions.

FIG. 1A illustrates an example communication system 100 according to at least one example embodiment. The system 100 includes a device 110, a communication network 108 including a communication channel 109, and a device 112. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices also connected to a common type of communication network 108. According to embodiments, the receiver 104A, 104B of devices 110 or 112 may correspond to a graphics processing unit (GPU), a switch (e.g., a high-speed network switch), a network adapter, a central processing unit (CPU), etc. As another specific but non-limiting example, the devices 110 and 112 may correspond to servers offering information resources, services and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104A, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104B of device 112. In an embodiment, the transmitter 102 includes a decision generation component 150. Additional details of the structure of the receiver 104B and decision generation component 150 are discussed in more detail below with reference to the figures.

The receiver 104A, 104B of device 110 and device 112 may include suitable hardware and/or software for receiving signals, for example, data signals from the communication network 108. For example, the receivers 104A, 104B may include components for receiving processing signals to extract the data for storing in a memory.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 136 may include other processing devices, storage devices, and/or communication interfaces generally associated with computing tasks, such as sending and receiving data.

FIG. 1B illustrates a block diagram of an exemplary communication system 100 employing an example PAM modulation scheme. In the example shown in FIG. 1, a PAM level-4 (PAM4) modulation scheme is employed with respect to the transmission of a signal (e.g., digitally encoded data) from a transmitter (TX) 102 to a receiver (RX) 104 via a communication channel 106 (e.g., a transmission medium). In this example, the transmitter 102 receives 101 an input data (i.e., the input data at time n is represented as "a(n)"), which is modulated in accordance with a modulation scheme (e.g., PAM4) and sends 103 the signal a(n) including a set of data symbols (e.g., symbols −3, −1, 1, 3, wherein the symbols represent coded binary data). It is noted that while the use of the PAM4 modulation scheme is described herein by way of example, other data modulation schemes can be used in accordance with embodiments of the present disclosure, including for example, a PAM2 modulation scheme, PAM8, PAM16, etc. For example, for a PAM2-based system, the transmitted data symbols consist of symbols −1 and 1, with each symbol value representing a binary bit. Typically a binary bit 0 is encoded as −1, and a bit 1 is encoded as 1 as the PAM2 values.

In the example shown, the PAM4 modulation scheme uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11 or 00, 01, 11, 10 while using Gray coding).

The communication channel 106 is a destructive medium in that the channel acts as a low pass filter which attenuates higher frequencies more than it attenuates lower frequencies and introduces inter-symbol interference (ISI). The communication channel 106 can be over serial links (e.g., a cable, printed circuit boards (PCBs) traces, copper cables, optical fibers, or the like), read channels for data storage (e.g., hard disk, flash solid-state drives (SSDs), high-speed serial links, deep space satellite communication channels, applications, or the like.

The receiver (RX) 104 includes a decision generation component 150, which is a circuit configured to generate a hard decision including a sequence of one or more bits that represent each symbol of a sequence of symbols corresponding to samples of the received signal (e.g., the "decision", "hard decision", or "hard decoded bits") and a confidence level corresponding to each of the generated hard decisions (e.g., the "confidence level" or "soft decision"). According to embodiments, the decision generation component 150 performs soft MLSE processing with differential precoding to generate the hard decisions (e.g., hard decoded symbols/bits) and corresponding soft decisions (e.g., confidence level for each hard decision).

Figure 2:
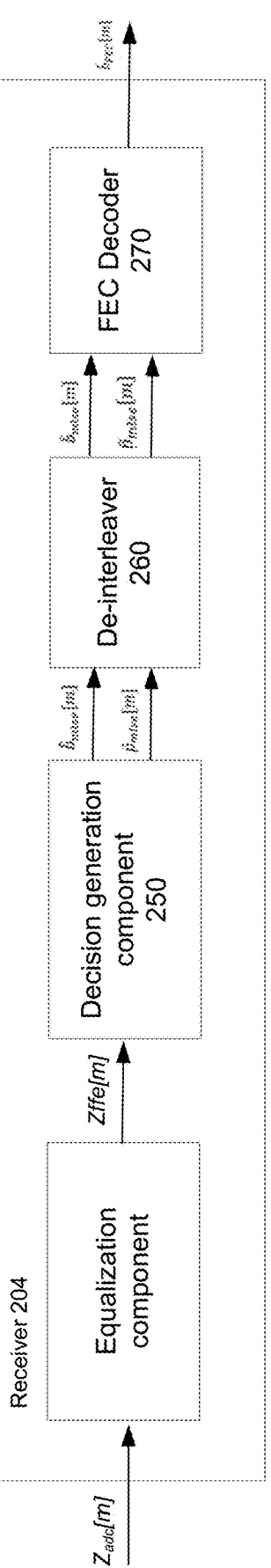
FIG. 2 illustrates an example receiver device including a decision generation component to generate a hard decoded bit decision and a corresponding confidence level associated with a received signal, in accordance with at least some embodiments.

FIG. 2 illustrates an example receiver 204 includes an equalization component 240 that receives input data ($z_{adc}$[m]) for each time instance 'm' and equalizes the input data a partial response ($z_{ffe}$[m]), such as PR1 or PR2. The output of the equalization ($z_{ffe}$[m]) is provided to a decision generation component 250 (e.g., a soft MLSE including differential precoder) to be decoded. In an embodiment, the decision generation component 250 receives the output ($z_{ffe}$[m]) of the equalization component 210 and generates hard decoded bits ($\hat{b}_{mlse}$[m]) and a soft decision confidence level or certainty signal ($\hat{p}_{mlse}$[m]), for each time sample 'm'. In an embodiment, the confidence level $\hat{p}_{mlse}$[m] is a log likelihood ratio (LLR) which is represented as a positive number ≥0 to indicate a level of certainty that a current bit $\hat{b}_{mlse}$[m]=b, b∈[0,1], where higher numbers represent a higher level of confidence or certainty, and where 0 represents no certainty. In an embodiment, the confidence level or certainty signal is known as a bit Log-Likelihood Ratio (LLR), which is the log probability ratio of an approximation of a first probability that the current bit $\hat{b}_{mlse}$[m] equals "1" and an approximation of a second probability that the current bit $\hat{b}_{mlse}[m]$ equals "0", or vice versa. For example, in a PAM2 system, the confidence level is determined based on an approximated first probability that the hard decision is "1" divided by an approximated second probability that the hard decision is "0", or vice versa. In an embodiment, the confidence level is represented by the LLR, which is a ratio of the approximated log probabilities corresponding to the hard decision values (e.g., "1" or "0" for a PAM2 system).

In an embodiment, some communication protocols include an interleaver component in the transmitter (e.g., transmitter 102 of FIGS. 1A and 1B) to handle error burst events and to transform MSLE errors to white noise. In such embodiments, the receiver 204 includes a de-interleaver 260 to process the output of the decision generation component 250. In an embodiment, the de-interleaver 260 generates output bits (b~_mlse [m]) that are decoded by an FEC decoder 270 using the interleaved version of the certainty signal (p~_mlse [m]) to generate an FEC output (b^_FEC [m]). In an embodiment, the FEC decoder 270 can include a soft inner or outer FEC decoder.

Figure 3:
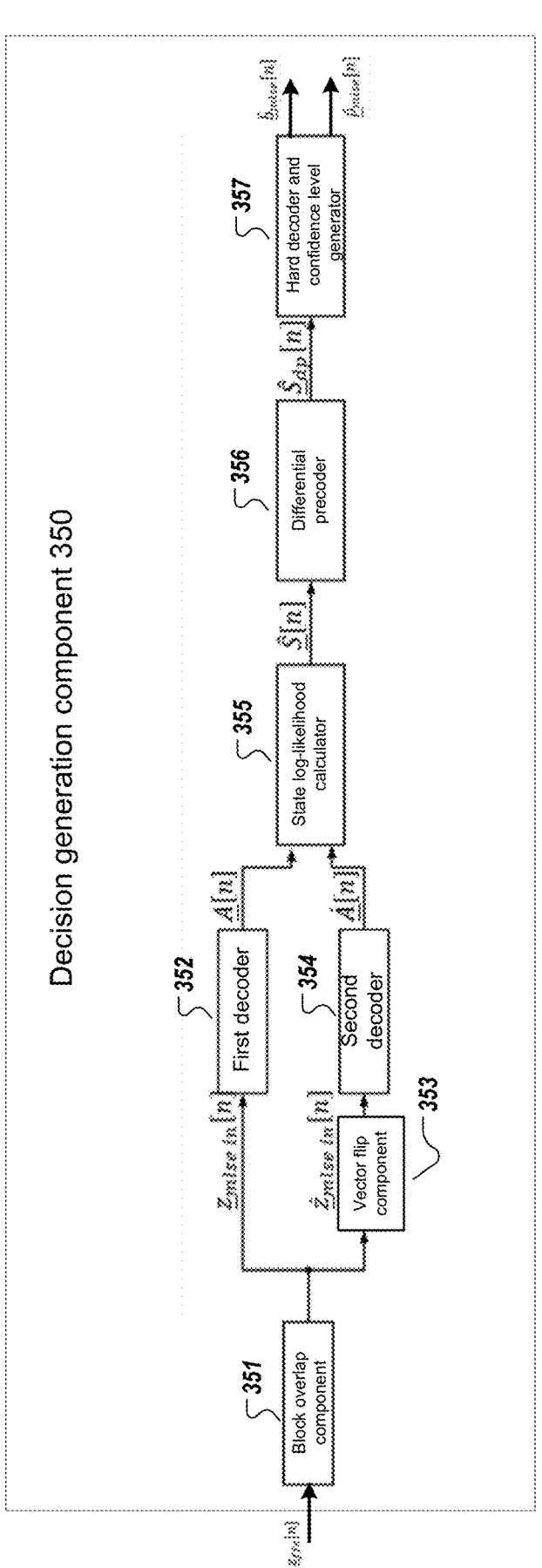
FIG. 3 illustrates an example decision generation component to generate a hard decoded bit decision and a corresponding confidence level associated with a received signal, in accordance with at least some embodiments.

FIG. 3 illustrates an example decision generation component 350, according to embodiments of the present disclosure. In an embodiment, the decision generation component 350 is configured for implementation in a high-speed architecture with a high data rate processed by parallel hardware, where the input to the decision generation component 350 is divided into multiple blocks. In an embodiment, each block (having a length N) is decoded by the decision generation component 350 to generate the hard decision bits and their corresponding confidence level (e.g., LLR signal).

In an embodiment, first, in each time sample 'n', the input signal vector $z_{ffe}[n]$, is processed by a block overlap component 351 to generate an "overlap" block, where 'n' is the block number, and $z_{iffe}[n]$ is the 'i'$_{th}$ sample in the block 'n', and where i=0 . . . . N−1, and where m=N*n+i. The block overlap component 351 adds a first subset of symbols of a first overlap block (e.g., pre-overlap symbols) to an input block of symbols and generates a new vector $z_{mlse~in}[n]$, where i=−pre, . . . , 0, . . . , N−1, N+post−1, with vector length of N+pre+post symbols.

FIG. 4 illustrates an example presents the pre and post symbols which are being added to each input block. In an embodiment, the first subset of blocks ("pre") includes a portion of a previous input block 401 and the second subset of blocks ("post") includes a portion of a next input block 403. As shown in FIG. 4, the first subset of "pre" blocks (e.g., a portion including 4 blocks of the previous input block 401) and the second subset of "post" blocks (e.g., a portion including 4 blocks of the next input block 403) are added to the current input block 402 (e.g., a set of 16 blocks). The first subset of pre-overlap symbols and the second subset of post-overlap symbols are added to the current input block 402 to improve the performance (e.g., BER results) of the decision generation component.

With reference to FIG. 3, the overlapped vector $z_{mlse~in}[n]$ and a flipped version $\overset{\sim}{z}_{mlse~in}[n]$ are decoded by a first decoder 352 and a second decoder 354. In an embodiment, the flipped version ($\overset{\sim}{z}_{mlse~in}[n]$) is generated by a vector flip component 353. In an embodiment, the first decoder 352 and the second decoder 254 are configured to execute a Viterbi algorithm to generate a log-probabilities metrics matrix $\underline{A}$ for the overlapped vector and a log-probabilities metrics matrix for the flip version $\underline{\dot{A}}$. In an embodiment, the dimensions of the matrices are the number of the Viterbi states over the length of the block, e.g., # states x (N+pre+post). In an embodiment, each column $\underline{a}_i$ in the matrix $\underline{A}$ provides the log-probabilities of the Viterbi states given the input signals till the sample i.

In an embodiment, the decision generation component 350 includes a state log-likelihood calculator 355 configured to generate the Viterbi state's log-likelihood matrix $\hat{\underline{S}}[n]$ given all the input vector $z_{mlse~in}[n]$. In an embodiment, the decision generation component 350 includes a differential precoder 356 configured to calculate the symbol's log-likelihood matrix $\hat{\underline{S}}_{dp}[n]$. In the differential precoder operation, for every sample 'i', each of the state's log-likelihood vectors is transformed to a PAM symbol's log-likelihood vector, where the dimensions of the matrix $\hat{\underline{S}}_{dp}[n]$ are PAMx(N+pre+post).

In an embodiment, the decision generation component 350 includes a hard bits detector and bit LLR calculator 357 uses the symbol log-likelihood $\hat{\underline{S}}_{dp}[n]$ to calculate the hard decision bits ($\hat{b}_{mlse}[n]$) and the confidence level $\hat{p}_{mlse}[n]$ (e.g., the approximation of the LLR signal), which transforms a symbol's log likelihood vector to a bit confidence level vector (e.g., a LLR vector).

In an embodiment, the soft MLSE, for each symbol 'i' in the "block" (vector) 'n', is the state's log likelihood probabilities vector $\underline{S}_i[n]$ (vector in the length of the number of states) which stands for the log probability given the input vector $z_{mlse~in}[n]$ of the optimal sequence which crosses through $x_i=X_j$, where $x_i$ is the Viterbi state at the sample i, and $X_j$ in one of the Viterbi states. In an embodiment, the state's log likelihood probabilities vector $S_{ij}[n]$ can be represented by the following expression:

$$S_{ij}[n] = \underset{\underline{x}[n]w.o\,x_i[n]}{\mathrm{argmax}} \ (\log\,(P(\underline{x}[n],\,x_2[n] = X_j\,|\,z_{mlse\,in}[n])))$$

Figure 5:
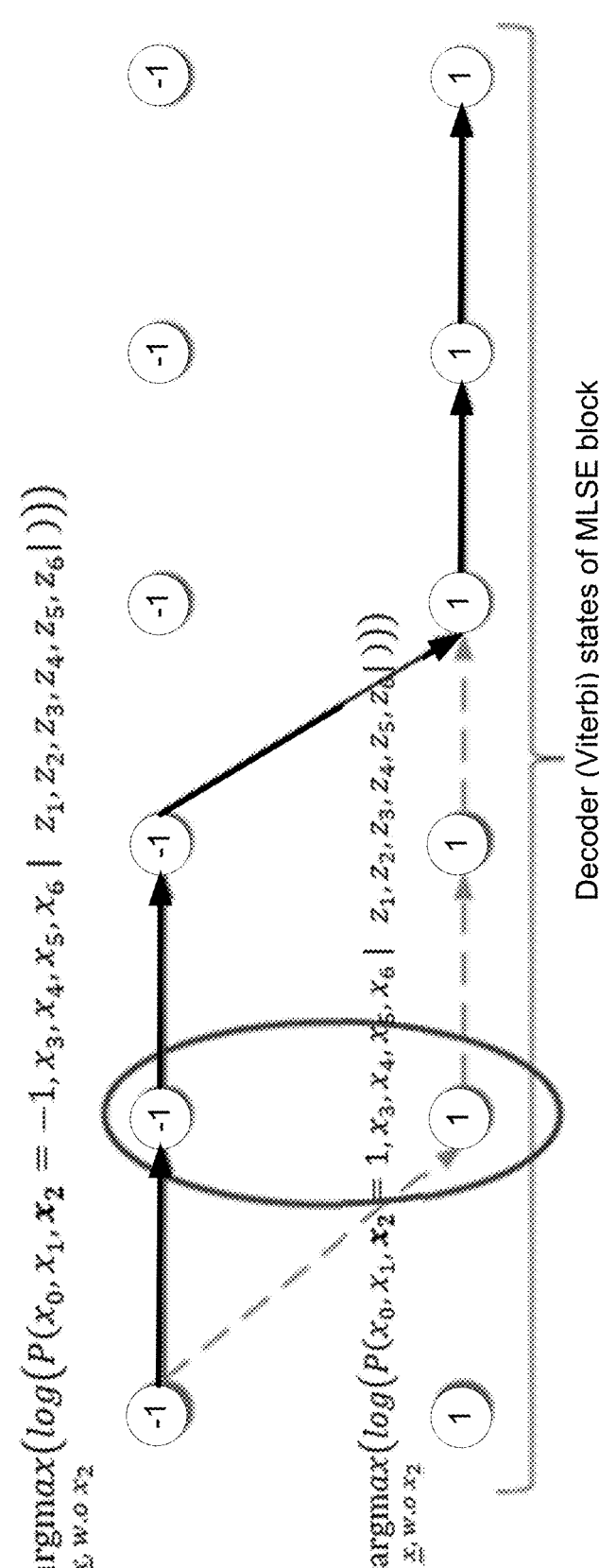
FIG. 5 illustrates an example soft MLSE definition, in accordance with at least some embodiments.

FIG. 5 illustrates an example of the soft MLSE definition for an PAM2 modulation scheme including a 2 taps Viterbi case (e.g., 2 states), for a sample=2, in a block with 6 symbols. As shown in FIG. 5, for the time sample i=2, an optimal sequence is identified which crosses the state $x_2=−1$ (e.g., solid arrows) and an optimal sequence which crosses the state $x_2=1$ (e.g, the dashed arrows). In this example, the calculation provides two log probabilities when $x_2=−1$ and $x_2=1$, as shown in the following expressions:

$$x_2 = -1 \ -> S_{2,-1}[n] \ \underset{\underline{x}[n]w.o\,x_2[n]}{\mathrm{argmax}} \ (\log\,(P(\underline{x}[n],\,x_2[n] = -1|z_{mlse\,in}[n])))$$

$$x_2 = 1 \ -> S_{2,1}[n] = \underset{\underline{x}[n]w.o\,x_2[n]}{\mathrm{argmax}} \ (\log\,(P(\underline{x}[n],\,x_2[n] = 1\,|\,z_{mlse\,in}[n])))$$

In an embodiment, for an example input signal based on PAM4 modulation with a 2 taps Viterbi, the soft MLSE definition for each sample 'i' a vector of 4 log probabilities of the states is represented by the following:

$$x_i = -3 \ -> S_{i,-3}[n] = \underset{\underline{x}[n]w.o\,x_i[n]}{\mathrm{argmax}} \ (\log\,(P(\underline{x}[n],\,x_2[n] = -3\,|\,z_{mlse\,in}[n])))$$

$$x_i = -1 \ -> S_{i,-1}[n] = \underset{\underline{x}[n]w.o\,x_i[n]}{\mathrm{argmax}} \ (\log\,(P(\underline{x}[n],\,x_2[n] = -1\,|\,z_{mlse\,in}[n])))$$

-continued $$x_i = 1 \; -> \; S_{i,1}[n] = \underset{\underline{x}[n]w.o\,x_i[n]}{\mathrm{argmax}} \; (\log(P(\underline{x}[n], x_2[n] = 1 \mid z_{mlse\,in}[n])))$$

$$x_i = 3 \; -> \; S_{i,3}[n] = \underset{\underline{x}[n]w.o\,x_i[n]}{\mathrm{argmax}} \; (\log(P(\underline{x}[n], x_2[n] = 3 \mid z_{mlse\,in}[n])))$$

In another example, the decision generation component can process a PAM4 and 3 taps Viterbi to provide, for each sample 'i', a vector of 16 log probabilities of the states according to the following expression:

$$x_i = X_j, \; x_{i-1} = X_k$$

$$\downarrow$$

$$S_{i,j,k}[n] =$$

$$\underset{\underline{x}[n]w.o\,x_i[n]\,and\,x_{i-1}[n]}{\mathrm{argmax}} \; (\log(P(\underline{x}[n], x_i[n] = X_j, x_{i-1} = X_k \mid z_{mlse\,in}[n])))$$

In an embodiment, the soft MLSE calculation can be performed by implementing using a first decoder and a second decoder configured to execute respective Viterbi algorithms (e.g., the first decoder executing the Viterbi algorithm on input vector $z_{mlse\,in}[n]$, and the second decoder executing the Viterbi algorithm on the flipped version of the input vector $\dot{z}_{mlse\,in}[n]$). In an embodiment, for the flipped vector Viterbi (e.g., the second decoder), the channel taps (e.g., the Viterbi weights) can also be flipped.

Figure 6:
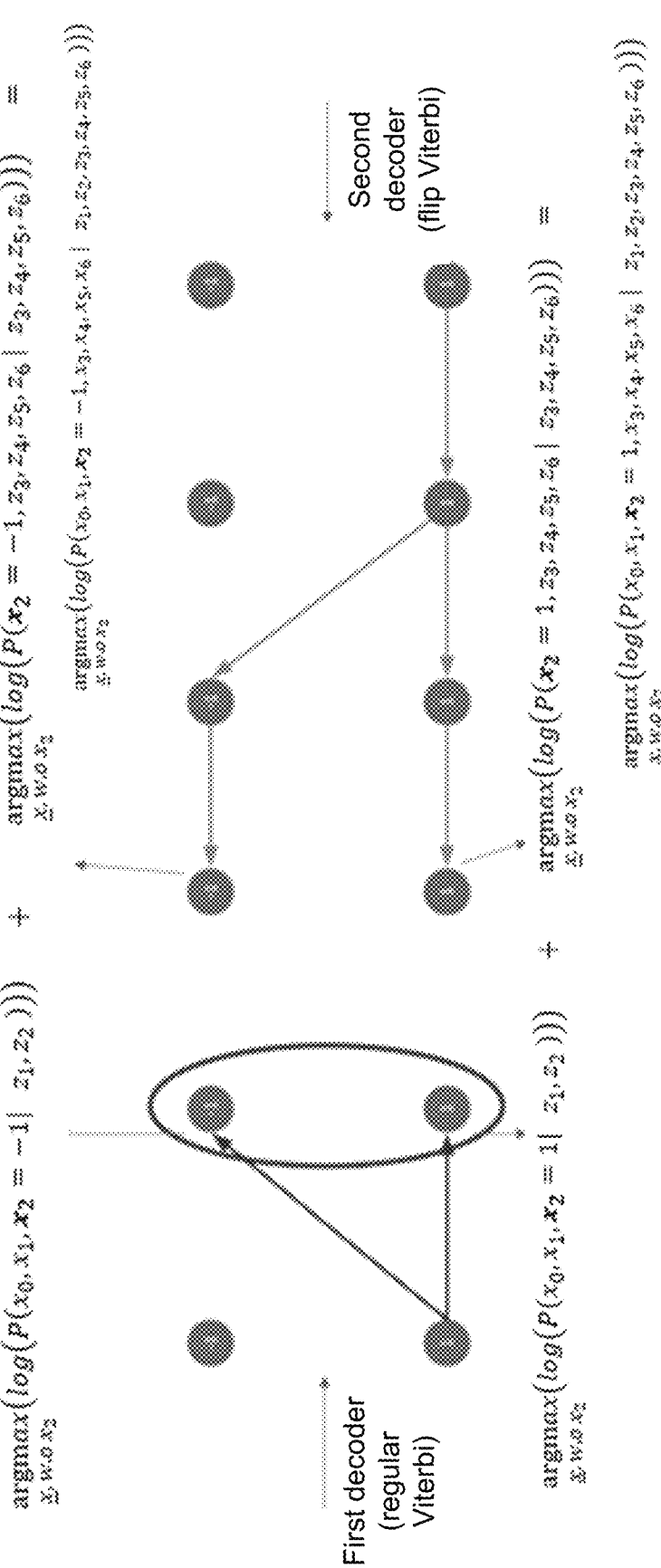
FIG. 6 illustrates an example calculation corresponding to a first Viterbi decoder and a second Viterbi decoder to generate accumulated metrics calculations, in accordance with at least some embodiments.

FIG. 6 illustrates the accumulated metrics calculations generated by the first decoder (e.g., first decoder 352 of FIG. 3) and the second decoder (e.g., second decoder 354 of FIG. 3). In the example shown in FIG. 6, the dual Viterbis' accumulated metrics calculations are generated for an PAM2 modulated signal with 2 taps Viterbi case (2 states), for the sample i=2. As shown in FIG. 6, the regular Viterbi (e.g., first decoder 352 of FIG. 3) calculates the accumulated metrics (log likelihood probabilities) using the samples 1 and 2 from the input vector $z_{mlse\,in}[n]$ for $x_2=-1$ and $x_2=1$, according to the following expressions corresponding to:

$$x_2 = -1 \; -> \; S_{2,-1}[n] = \underset{\underline{x}[n]w.o\,x_2[n]}{\mathrm{argmax}} \; (P(x_1[n], x_2[n] = -1 \mid z_1[n], z_2[n]))$$

$$x_2 = 1 \; -> \; S_{2,1}[n] = \underset{\underline{x}[n]w.o\,x_2[n]}{\mathrm{argmax}} \; (P(x_1[n], x_2[n] = 1 \mid z_1[n], z_2[n]))$$

In an embodiment, the flipped Viterbi (e.g., second decoder 354 of FIG. 3) calculates the accumulated metrics (log probabilities) using the samples 3-6 from the input vector $z_{mlse\,in}[n]$ for $x_2=-1$ and $x_2=1$, according to the following expressions corresponding to:

$$x_2 = -1 \; -> \; S_{2,-1}[n] \underset{\underline{x}[n]w.o\,x_2[n]}{\mathrm{argmax}} \; (P(x_2[n] = -1, x_3[n] - x_6[n] \mid z_3[n] - z_6[n]))$$

$$x_2 = 1 \; -> \; S_{2,1}[n] = \underset{\underline{x}[n]w.o\,x_2[n]}{\mathrm{argmax}} \; (P(x_2[n] = 1, x_3[n] - x_6[n] \mid z_3[n], z_6[n]))$$

As illustrated in the example shown in FIG. 6, to calculate the state's log probabilities, for the sample 'i'=2 given all the input vector $z_{mlse\,in}[n]$, samples 1-6, the log probabilities of the two Viterbis are added.

Figure 7:
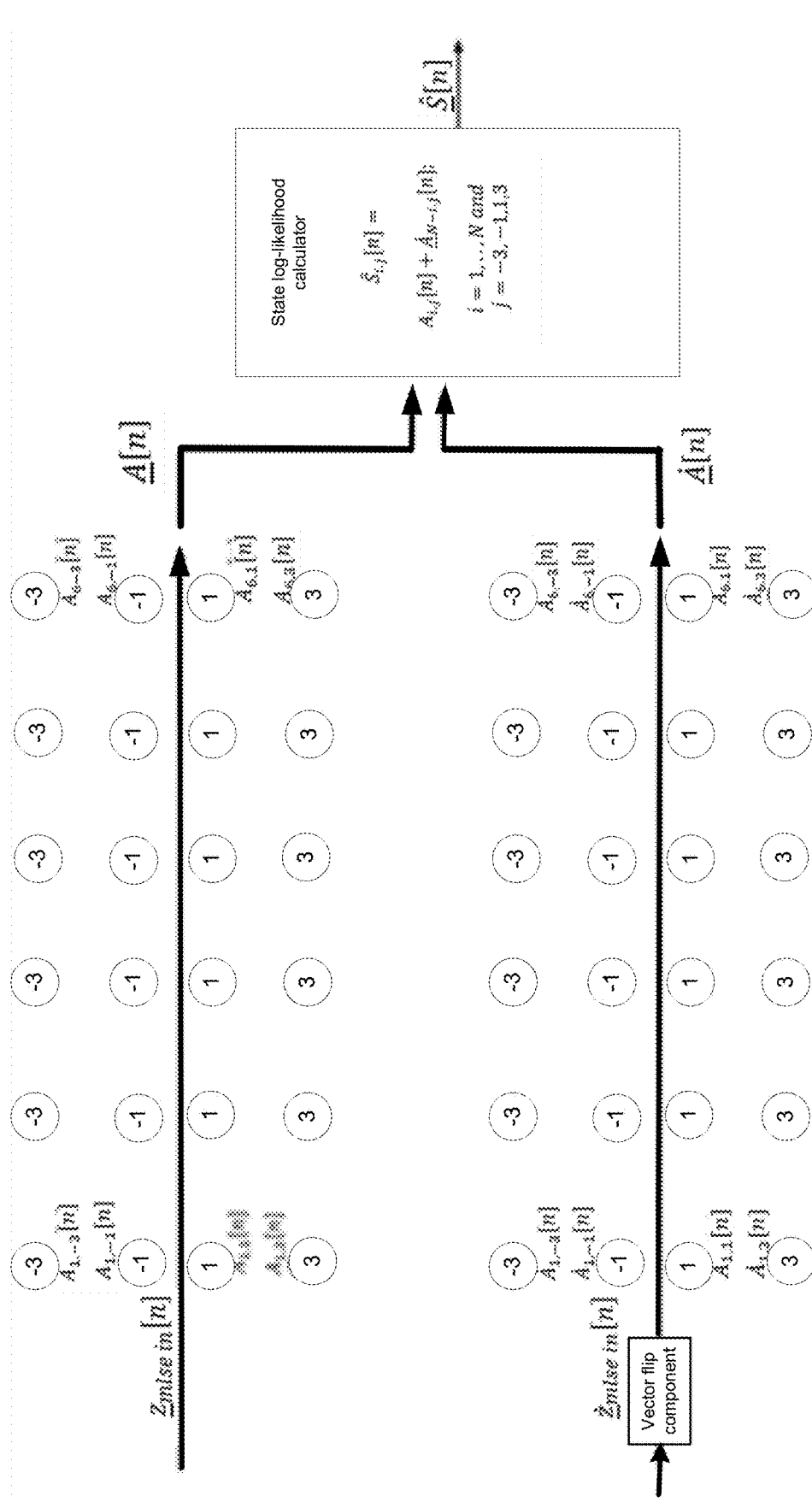
FIG. 7 illustrates example processing by two Viterbi decoders and a corresponding state log likelihood probability generator of a decision generation component, in accordance with at least some embodiments.

FIG. 7 illustrates an example including two Viterbi blocks which provide the log likelihood matrix $\underline{A}$ and a flipped version $\dot{\underline{A}}$, for a PAM4 2 taps Viterbi case. Moreover, as shown, the state's log likelihood calculation is executed to generate $\underline{\hat{S}}[n]$, which is in the size 4x(N+pre+post), and for each sample 'i' in the block 'n', resulting in a vector of 4 state's log likelihood probabilities ($\underline{\hat{S}}[n]$).

In an embodiment, the state probabilities vector $\underline{\hat{S}}[n]$ and the number of probabilities depends on the equalized signal or partial response. For example, in PR1, there are 4 state probabilities which correspond to the symbol values $(-3, -1, 1, 3)$, while in PR2, there are 16 state probabilities correspond to the following symbol sequences: $-3\,-3$, $-3\,-1$, $-3\,1$, ... etc.

With reference to FIG. 3, the differential precoder 356 receives the output of the state log-likelihood calculator (e.g., the state probabilities vector $\underline{\hat{S}}[n]$) and generates a corresponding symbol's log likelihood probabilities vector ($\underline{\hat{S}}_{dp}[n]$). In an embodiment, $\underline{\hat{S}}_{dp}[n]$ is a symbol probability corresponding to the symbol values $(-3, -1, 1, 3)$, independent of the partial response. In an example, the differential precoder 356 includes a 1−D encoder and 1+D decoder that can be used for any number of Viterbi taps, including, for example, the 2 taps and 3 taps Viterbi cases described in detail herein). In an embodiment, non-symmetric PR (e.g., 1+0.5D) can be implemented, where the PR response of the flipped Viterbi is flipped (e.g., for the flipped Viterbi, 0.5+1D is used).

In an embodiment, the output of the state's log likelihood calculation (e.g., the state probabilities vector $\underline{\hat{S}}[n]$) at the sample 'i' in the block 'n' is a vector of 4 log likelihood probabilities in the 2 taps case Viterbi and a 16 log likelihood probabilities vector in the 3 taps Viterbi case. In an embodiment, the differential precoder 356 executes a differential precoder operation to transform the state's log likelihood probabilities to the symbol's likelihood probabilities $\underline{\hat{S}}_{dp}[n]$. In an embodiment, the differential precoder 356 performs a deterministic mapping from hard symbols to hard symbols. An example of the deterministic receiver-side mapping for the 1+D case and PAM4, the receiver side is illustrated in FIG. 8.

In an embodiment, the differential decoder 356 calculates, for each element in the symbol log likelihood probabilities output vector, all the possible options of state's log likelihood probabilities. In an embodiment, the differential decoder 356 can use the differential precoder receiver mapping (e.g., as shown in FIG. 8), and select a maximal one to be the symbol's log likelihood probability. In an embodiment, for each sample 'i', the soft decision output of this operation is a vector of the length of the modulated PAM.

For example, in the PAM4 2 taps Viterbi case, the differential precoder operation is performed to move or transform from the state's log likelihood probabilities vector to the symbol's log likelihood probabilities vector for the sample 'i', as illustrated by the following:

$$\hat{S}_{dp\,i,-3}[n] = \max\left(\left[\left(\hat{S}_{i,-3}[n] + \hat{S}_{i-1,-3}[n]\right),\right.\right.$$
$$\left.\left(\hat{S}_{i,-1}[n] + \hat{S}_{i-1,3}[n]\right), \left(\hat{S}_{i,1}[n] + \hat{S}_{i-1,1}[n]\right), \left(\hat{S}_{i,3}[n] + \hat{S}_{i-1,-1}[n]\right)\right]\right)$$

$$\hat{S}_{dp\,i,-1}[n] = \max\left(\left[\left(\hat{S}_{i,-3}[n] + \hat{S}_{i-1,-1}[n]\right),\right.\right.$$
$$\left.\left(\hat{S}_{i,-1}[n] + \hat{S}_{i-1,-3}[n]\right), \left(\hat{S}_{i,1}[n] + \hat{S}_{i-1,3}[n]\right), \left(\hat{S}_{i,3}[n] + \hat{S}_{i-1,1}[n]\right)\right]\right)$$

$$\hat{S}_{dp\,i,1}[n] = \max\left(\left[\left(\hat{S}_{i,-3}[n] + \hat{S}_{i-1,1}[n]\right),\right.\right.$$

-continued $$(\hat{S}_{i,-1}[n] + \hat{S}_{i,-1,-1}[n]), (\hat{S}_{i,1}[n] + \hat{S}_{i-1,-3}[n]), (\hat{S}_{i,3}[n] + \hat{S}_{i-1,3}[n])])$$

$$\hat{S}_{dp\,i,3}[n] = \max([(\hat{S}_{i,-3}[n] + \hat{S}_{i-1,3}[n]),$$

$$(\hat{S}_{i,-1}[n] + \hat{S}_{i-1,1}[n]), (\hat{S}_{i,1}[n] + \hat{S}_{i-1,-1}[n]), (\hat{S}_{i,3}[n] + \hat{S}_{i-1,-3}[n])])$$

In another example, in the PAM4 3 taps Viterbi case, the differential precoder operation is performed to move from the state's log likelihood probabilities vector (which is in the size of 16×1) to the symbol's log likelihood probabilities vector (which is in the size of 4×1), for the sample 'i', as illustrated by the following:

$$\hat{S}_{dp\,i,-3}[n] = \max([\hat{S}_{i,-3,-3}[n], \hat{S}_{i,-1,3}, \hat{S}_{i,1,1}, \hat{S}_{i,3,-1}])$$

$$\hat{S}_{dp\,i,-3}[n] = \max([\hat{S}_{i,-3,-3}[n], \hat{S}_{i,-1,3}, \hat{S}_{i,1,1}, \hat{S}_{i,3,-1}])$$

$$\hat{S}_{dp\,i,-3}[n] = \max([\hat{S}_{i,-3,-3}[n], \hat{S}_{i,-1,3}, \hat{S}_{i,1,1}, \hat{S}_{i,3,-1}])$$

$$\hat{S}_{dp\,i,-3}[n] = \max([\hat{S}_{i,-3,-3}[n], \hat{S}_{i,-1,3}, \hat{S}_{i,1,1}, \hat{S}_{i,3,-1}])$$

In an embodiment, the decision generation component 350 includes a hard decoder and confidence level generator 357. In an embodiment, the hard decoder and confidence level generator 357 decode, for each sample 'i', hard decision bits and, for each bit, a corresponding confidence level (e.g., an approximation of an LLR value). In an embodiment, the hard decision bits depend on the number of bits per symbol and the bit symbol mapping.

For example, in a PAM4 case, the hard decision symbol is selected according to the following formula:

$$\hat{x}_i[n] = \text{argmax}\left([\hat{S}_{dp\,i,-3}[n], \hat{S}_{dp\,i,-1}[n], \hat{S}_{dp\,i,1}[n], \hat{S}_{dp\,i,3}[n]]\right)$$

Figure 9:
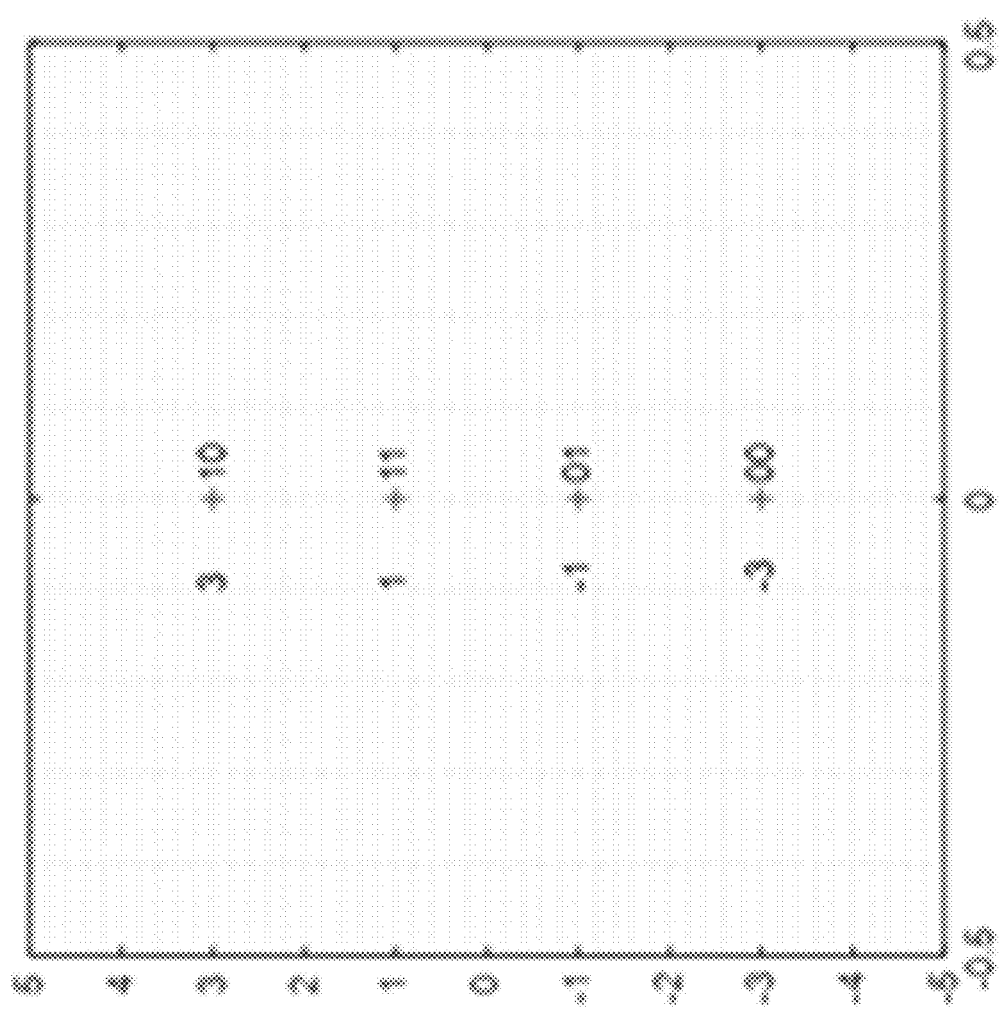
FIG. 9 illustrates an example bits-symbol mapping used by a decision generation component, in accordance with at least some embodiments.

In an embodiment, the bits-symbol mapping can be performed using a gray mapping, an example of which is illustrated in FIG. 9. In an embodiment, the hard decision bits $\hat{b}_{mlse}[n]$ can be decoded from $\hat{x}_i[n]$ and the bit mapping (e.g., as shown in the example of FIG. 9). For example, using the expressions provided above, argmax [2, 1, 3.5, 5]='3', where a maximum value is 5, which correlates to a probability of symbol '3', resulting in the selection of symbol '3'.

In an embodiment, the confidence level (e.g., an approximation of the LLR) can be calculated (e.g., for a PAM4 case), using the gray mapping in FIG. 9, according to the following:

$$LLr_{msb\,i}[n] =$$

$$\text{abs}\left(\max([\hat{S}_{dp\,i,1}[n], \hat{S}_{dp\,i,3}[n]]) - \max([\hat{S}_{dp\,i,-3}[n], \hat{S}_{dp\,i,-1}[n]])\right)$$

$$LLR_{lsb\,i}[n] =$$

$$\text{abs}\left(\max([\hat{S}_{dp\,i,-1}[n], \hat{S}_{dp\,i,1}[n]]) - \max([\hat{S}_{dp\,i,3}[n], \hat{S}_{dp\,i,-3}[n]])\right)$$

Advantageously, as described in detail above, the decision generation component 350 determines the confidence level ($\hat{P}_{mlse}[n]$) for each hard decoded bit.

FIG. 10 is a flow diagram of a method 1000 of decoding a received digital signal to determine a hard decision (e.g., a fixed set of possible values such at "0" or "1" in binary code) corresponding to samples of the received digital signal with a corresponding soft decision decoding to generate a confidence level (e.g., a number in a range of values) that indicates a confidence or certainty for each hard decoded decision (e.g., each symbol/bit). The method 1000 can be performed by processing logic comprising hardware, software, firmware, or any combination thereof. In at least one embodiment, the method 1000 is performed by the decision generation component 150 of FIGS. 1A and 1B, the decision generation component 250 of FIG. 2, or the decision generation component 350 of FIG. 3. In at least one embodiment, the method 1000 is performed by various components of the decision generation component 150, 250, and 350 to generate the hard decoded bits and a corresponding soft decoded confidence level for each of the bits of a received signal in a communication system, according to embodiments. According to embodiments, the method 1000 can be performed by a receiver (e.g., a receiver device in a communications system) having a decision generation component, in accordance with the embodiments described herein with reference to a receiver-side decision generation component. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1010, the digital signal receiver receives a signal including a sequence of samples corresponding to symbols. In an embodiment, the signal can be transmitted in accordance with a suitable modulation scheme (e.g., PAM, QAM, etc.).

At operation 1020, the digital signal receiver generates an equalized signal with an estimated sequent of symbols corresponding to the signal. In an embodiment, the equalized signal can be a partial response (e.g., a PR1 signal, a PR2 signal, etc.) including the original symbols with residual inter-symbol-interference (ISI).

At operation 1030, the digital signal receiver generates, based on the equalized signal, a decision comprising a sequence of one or more bits that represent each symbol of the sequence of symbols and a confidence level corresponding to the decision. In an embodiment, the digital signal receiver includes a decision generation component configured to implement soft MLSE processing to calculate a state's log likelihood probability vector for each input sample corresponding to the equalized signal (e.g., the partial response of the received digital signal), where each state probability corresponds to a possible symbol value corresponding to the partial response. For example, in a PR1 signal, there are 4 state probabilities which correspond to symbol values (−3, −1, 1, 3). In another example, in a PR2 signal, there are 16 state probabilities corresponding to symbol sequences −3 −3, −3 −1, −3 1, . . . etc.

In an embodiment, the state's log likelihood probabilities vector for each sample is determined by executing an estimation (e.g., a Viterbi algorithm) on the symbol block via a first decoder (e.g., a regular Viterbi that processes the regular input vector) and a second decoder (e.g., a flipped Viterbi) that processes a flipped version of the input vector. The two decoders (e.g., the regular Viterbi and the flipped Viterbi) provide, for each input sample, a partition (from the input samples) of the state's log likelihood probabilities vector. In an embodiment, a summation or addition operation can be executed using the two generated vectors to determine a full state's log likelihood probabilities vector for the sample.

In an embodiment, the digital signal receiver transforms the state's log likelihood probabilities vector to a symbol's log likelihood probabilities vector (e.g., in accordance with an applicable modulation scheme (e.g., PAM4) with a differential precoder operation. In an embodiment, using the differential precoder operation and a maximum operation, all the possible options of state's log likelihood probabilities are calculated for each element in the symbol log likelihood probabilities output vector. In an embodiment, the decision generation component uses a differential precoder receiver mapping (e.g., as shown in FIG. 8), and selects a maximal symbol value as the one to be the symbol's log likelihood probability.

Figure 11:
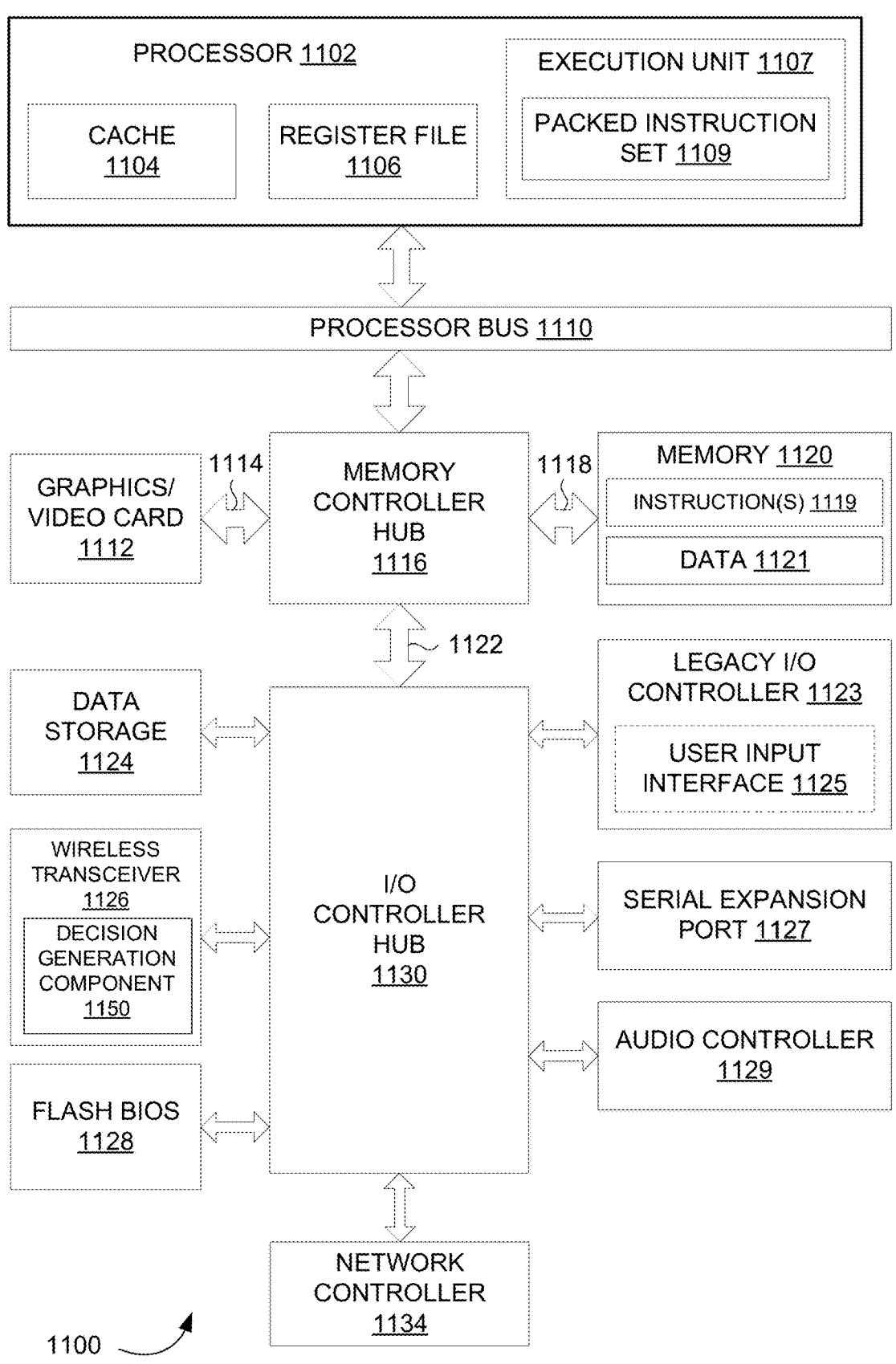
FIG. 11 illustrates an example computer system including a wireless transceiver including a decision generation component, in accordance with at least some embodiments.

FIG. 11 illustrates a computer system 1100, in accordance with at least one embodiment. In at least one embodiment, computer system 1100 may be a system with interconnected devices and components, an SOC, or some combination. In at least one embodiment, computer system 1100 is formed with a processor 1102 that may include execution units to execute an instruction. In at least one embodiment, computer system 1100 may include, without limitation, a component, such as processor 1102, to employ execution units including logic to perform algorithms for processing data. In at least one embodiment, computer system 1100 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1100 may execute a version of WINDOWS' operating system available from Microsoft Corporation of Redmond, Wash., although other operating systems (UNIX and Linux for example), embedded software, and/or graphical user interfaces may also be used.

In at least one embodiment, computer system 1100 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 1100 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 1100 may include, without limitation, processor 1102 that may include, without limitation, one or more execution units 1107 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 1100 is a single processor desktop or server system. In at least one embodiment, computer system 1100 may be a multiprocessor system. In at least one embodiment, processor 1102 may include, without limitation, a CISC microprocessor, a RISC microprocessor, a VLIW microprocessor, a processor implementing a combination of instruction sets, or any other processor device, such as a digital signal processor, for example. In at least one embodiment, processor 1102 may be coupled to a processor bus 1110 that may transmit data signals between processor 1102 and other components in computer system 1100.

In at least one embodiment, processor 1102 may include, without limitation, a Level 1 ("L1") internal cache memory ("cache") 1104. In at least one embodiment, processor 1102 may have a single internal cache or multiple levels of internal cache. In at least one embodiment, cache memory may reside external to processor 1102. In at least one embodiment, processor 1102 may also include a combination of both internal and external caches. In at least one embodiment, a register file 1106 may store different types of data in various registers including, without limitation, integer registers, floating point registers, status registers, and instruction pointer register.

In at least one embodiment, execution unit 1107, including, without limitation, logic to perform integer and floating point operations, also resides in processor 1102. Processor 1102 may also include a microcode ("ucode") read only memory ("ROM") that stores microcode for certain macro instructions. In at least one embodiment, execution unit 1107 may include logic to handle a packed instruction set 1109. In at least one embodiment, by including packed instruction set 1109 in an instruction set of a general-purpose processor 1102, along with associated circuitry to execute instructions, operations used by many multimedia applications may be performed using packed data in a general-purpose processor 1102. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 1100 may include, without limitation, a memory 1120. In at least one embodiment, memory 1120 may be implemented as a DRAM device, an SRAM device, flash memory device, or other memory devices. Memory 1120 may store instruction(s) 1119 and/or data 1121 represented by data signals that may be executed by processor 1102.

In at least one embodiment, a system logic chip may be coupled to processor bus 1110 and memory 1120. In at least one embodiment, the system logic chip may include, without limitation, a memory controller hub ("MCH") 1116, and processor 1102 may communicate with MCH 1116 via processor bus 1110. In at least one embodiment, MCH 1116 may provide a high bandwidth memory path 1118 to memory 1120 for instruction and data storage and for storage of graphics commands, data and textures. In at least one embodiment, MCH 1116 may direct data signals between processor 1102, memory 1120, and other components in computer system 1100 and to bridge data signals between processor bus 1110, memory 1120, and a system I/O 1122. In at least one embodiment, a system logic chip may provide a graphics port for coupling to a graphics controller. In at least one embodiment, MCH 1116 may be coupled to memory 1120 through high bandwidth memory path 1118, and graphics/video card 1112 may be coupled to
MCH 1116 through an Accelerated Graphics Port ("AGP")
interconnect 1114.

In at least one embodiment, computer system 1100 may
use system I/O 1122 that is a proprietary hub interface bus
to couple MCH 1116 to I/O controller hub ("ICH") 1130. In
at least one embodiment, ICH 1130 may provide direct
connections to some I/O devices via a local I/O bus. In at
least one embodiment, a local I/O bus may include, without
limitation, a high-speed I/O bus for connecting peripherals
to memory 1120, a chipset, and processor 1102. Examples
may include, without limitation, an audio controller 1129, a
firmware hub ("flash BIOS") 1128, a wireless transceiver
1126, a data storage 1124, a legacy I/O controller 1123
containing a user input interface 1125 and a keyboard
interface, a serial expansion port 1127, such as a USB, and
a network controller 1134. Data storage 1124 may comprise
a hard disk drive, a floppy disk drive, a CD-ROM device, a
flash memory device, or other mass storage device. In an
embodiment, the wireless transceiver 1126 includes a deci-
sion generation component 1150 (e.g., the decision genera-
tion component 150, 250, and 350 of FIGS. 1A, 1B, 2, and
3, respectively).

In at least one embodiment, FIG. 11 illustrates a system,
which includes interconnected hardware devices or "chips."
In at least one embodiment, FIG. 11 may illustrate an
exemplary SoC. In at least one embodiment, devices illus-
trated in FIG. 11 may be interconnected with proprietary
interconnects, standardized interconnects (e.g., PCIe), or
some combination thereof. In at least one embodiment, one
or more components of system 1100 are interconnected
using compute express link ("CXL") interconnects.

Other variations are within spirit of present disclosure.
Thus, while disclosed techniques are susceptible to various
modifications and alternative constructions, certain illus-
trated embodiments thereof are shown in drawings and have
been described above in detail. It should be understood,
however, that there is no intention to limit the disclosure to
a specific form or forms disclosed, but on the contrary, the
intention is to cover all modifications, alternative construc-
tions, and equivalents falling within the spirit and scope of
the disclosure, as defined in appended claims.

Use of terms "a" and "an" and "the" and similar referents
in the context of describing disclosed embodiments (espe-
cially in the context of following claims) are to be construed
to cover both singular and plural, unless otherwise indicated
herein or clearly contradicted by context, and not as a
definition of a term. Terms "comprising," "having," "includ-
ing," and "containing" are to be construed as open-ended
terms (meaning "including, but not limited to,") unless
otherwise noted. "Connected," when unmodified and refer-
ring to physical connections, is to be construed as partly or
wholly contained within, attached to, or joined together,
even if there is something intervening. Recitations of ranges
of values herein are merely intended to serve as a shorthand
method of referring individually to each separate value
falling within the range, unless otherwise indicated herein,
and each separate value is incorporated into the specification
as if it were individually recited herein. In at least one
embodiment, the use of the term "set" (e.g., "a set of items")
or "subset" unless otherwise noted or contradicted by con-
text, is to be construed as a nonempty collection comprising
one or more members. Further, unless otherwise noted or
contradicted by context, the term "subset" of a correspond-
ing set does not necessarily denote a proper subset of the
corresponding set, but subset and corresponding set may be
equal.

Conjunctive language, such as phrases of the form "at
least one of A, B, and C," or "at least one of A, B and C,"
unless specifically stated otherwise or otherwise clearly
contradicted by context, is otherwise understood with the
context as used in general to present that an item, term, etc.,
may be either A or B or C, or any nonempty subset of the set
of A and B and C. For instance, in an illustrative example of
a set having three members, conjunctive phrases "at least
one of A, B, and C" and "at least one of A, B and C" refer
to any of the following sets: {A}, {B}, {C}, {A, B}, {A, C},
{B, C}, {A, B, C}. Thus, such conjunctive language is not
generally intended to imply that certain embodiments
require at least one of A, at least one of B and at least one
of C each to be present. In addition, unless otherwise noted
or contradicted by context, the term "plurality" indicates a
state of being plural (e.g., "a plurality of items" indicates
multiple items). In at least one embodiment, the number of
items in a plurality is at least two, but can be more when so
indicated either explicitly or by context. Further, unless
stated otherwise or otherwise clear from context, the phrase
"based on" means "based at least in part on" and not "based
solely on."

Operations of processes described herein can be per-
formed in any suitable order unless otherwise indicated
herein or otherwise clearly contradicted by context. In at
least one embodiment, a process such as those processes
described herein (or variations and/or combinations thereof)
is performed under control of one or more computer systems
configured with executable instructions and is implemented
as code (e.g., executable instructions, one or more computer
programs or one or more applications) executing collec-
tively on one or more processors, by hardware or combina-
tions thereof. In at least one embodiment, code is stored on
a computer-readable storage medium, for example, in the
form of a computer program comprising a plurality of
instructions executable by one or more processors. In at least
one embodiment, a computer-readable storage medium is a
non-transitory computer-readable storage medium that
excludes transitory signals (e.g., a propagating transient
electric or electromagnetic transmission) but includes non-
transitory data storage circuitry (e.g., buffers, cache, and
queues) within transceivers of transitory signals. In at least
one embodiment, code (e.g., executable code or source
code) is stored on a set of one or more non-transitory
computer-readable storage media having stored thereon
executable instructions (or other memory to store executable
instructions) that, when executed (i.e., as a result of being
executed) by one or more processors of a computer system,
cause a computer system to perform operations described
herein. In at least one embodiment, a set of non-transitory
computer-readable storage media comprises multiple non-
transitory computer-readable storage media and one or more
of individual non-transitory storage media of multiple non-
transitory computer-readable storage media lack all of the
code while multiple non-transitory computer-readable stor-
age media collectively store all of the code. In at least one
embodiment, executable instructions are executed such that
different instructions are executed by different processors.

Accordingly, in at least one embodiment, computer sys-
tems are configured to implement one or more services that
singly or collectively perform operations of processes
described herein and such computer systems are configured
with applicable hardware and/or software that enable the
performance of operations. Further, a computer system that
implements at least one embodiment of present disclosure is
a single device and, in another embodiment, is a distributed
computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A digital receiver comprising:
a first component to receive a signal; and
a second component to:
    generate a first vector of a first sequence of a portion of symbols of the signal;
    generate a second vector of a second sequence of the portion of symbols; and
    generate, based at least in part on the first vector and the second vector, a decision comprising a sequence of one or more bits that represent a first symbol of the portion of symbols of the signal and a confidence level corresponding to the decision.

2. The digital receiver of claim 1, wherein the second sequence comprises a flipped version of the first sequence.

3. The digital receiver of claim 1, wherein the second component further comprises:
a first decoder to generate a first set of state probabilities corresponding to the first vector; and
a second decoder to generate a second set of state probabilities corresponding to the second vector.

4. The digital receiver of claim 3, the second component further to calculate a state probabilities vector based on the first set of state probabilities and the second set of state probabilities.

5. The digital receiver of claim 4, wherein the second component further comprises a third decoder to generate, based on the state probabilities vector, a set of symbol probabilities corresponding to the portion of symbols, and wherein the decision is generated based on the state probabilities vector.

6. The digital receiver of claim 1, wherein the second component executes a Viterbi algorithm comprising a set of states.

7. The digital receiver of claim 1, wherein the decision further comprises an additional sequence of one or more bits that represent a second symbol of the portion of symbols of the signal.

8. The digital receiver of claim 1, wherein the portion of the symbols comprises a first subset of symbols of a first input block.

9. The digital receiver of claim 8, wherein the portion of the symbols further comprises a second subset of symbols of a first overlap block received prior to the first input block.

10. The digital receiver of claim 9, wherein the portion of the symbols further comprises a third subset of symbols of a second overlap block received after the first input block.

11. A circuit to perform operations comprising:

generating a first vector of a first sequence of a portion of symbols of a signal;

generating a second vector of a second sequence of the portion of symbols; and generating, based at least in part on the first vector and the second vector, a decision comprising a sequence of one or more bits that represent a first symbol of the portion of symbols of the signal and a confidence level corresponding to the decision.

12. The circuit of claim 11, wherein the second sequence comprises a flipped version of the first sequence.

13. The circuit of claim 11, the operations further comprising:

generating a first set of state probabilities corresponding to the first vector; and generating a second set of state probabilities corresponding to the second vector.

14. The circuit of claim 13, the operations further comprising calculating a state probabilities vector based on the first set of state probabilities and the second set of state probabilities.

15. The circuit of claim 14, the operations further comprising generating, based on the state probabilities vector, a set of symbol probabilities corresponding to the portion of symbols.

16. The circuit of claim 11, the operations further comprising generating an equalized signal based on the signal, wherein the equalized signal is a partial response equalized signal.

17. A method comprising:

generating a first vector of a first sequence of a portion of symbols of a signal;

generating a second vector of a second sequence of the portion of symbols; and generating, based at least in part on the first vector and the second vector, a decision comprising a sequence of one or more bits that represent a first symbol of the portion of symbols of the signal and a confidence level corresponding to the decision.

18. The method of claim 17, wherein the second sequence comprises a flipped version of the first sequence.

19. The method of claim 17, further comprising:

generating a first set of state probabilities corresponding to the first vector; and generating a second set of state probabilities corresponding to the second vector.

20. The method of claim 19, further comprising further comprising:

calculating a state probabilities vector based on the first set of state probabilities and the second set of state probabilities; and generating, based on the state probabilities vector, a set of symbol probabilities corresponding to the portion of symbols.

* * * * *